United States Patent [19]

Wörner

[11] 4,044,874

[45] Aug. 30, 1977

[54] CLUTCH DISC WITH PLURAL FRICTION DAMPERS

[75] Inventor: Günter Wörner, Rommelshausen, Germany

[73] Assignee: Daimler-Benz Aktiengesellschaft, Germany

[21] Appl. No.: 461,115

[22] Filed: Apr. 15, 1974

[30] Foreign Application Priority Data

Apr. 14, 1973 Germany .............................. 2318908

[51] Int. Cl.² ............................................... F16D 3/66
[52] U.S. Cl. ................................... 192/106.2; 64/27 F
[58] Field of Search .......................... 192/106.1, 106.2; 64/27 F

[56] References Cited

U.S. PATENT DOCUMENTS

| 2,745,268 | 5/1956 | Reed | 192/106.2 X |
|---|---|---|---|
| 3,266,271 | 8/1966 | Stromberg | 192/106.2 X |
| 3,327,820 | 6/1967 | Maurice | 192/106.2 X |
| 3,800,931 | 4/1974 | Maucher | 192/106.2 X |

FOREIGN PATENT DOCUMENTS

| 62,494 | 6/1968 | Germany | 192/106.2 |
|---|---|---|---|
| 1,200,013 | 7/1970 | United Kingdom | 192/106.2 |

*Primary Examiner*—Benjamin W. Wyche
*Attorney, Agent, or Firm*—Craig & Antonelli

[57] ABSTRACT

A clutch disc for motor vehicle main clutches with a disc member carrying the friction linings and torsionally elastically arranged with respect to a hub member, whereby for a multi-stage torsional elasticity, several springs or spring sets with different characteristics are arranged in windows of a hub flange and of the disc member as well as of a side plate rigidly connected therewith; friction devices are thereby coordinated to the springs, whose starting point of operation is determined by a sheet metal control plate which with tabs, arms or the like engage into the corresponding windows and/or cooperate with the spring ends; at least one friction device coordinated to a harder spring stage is thereby moved up in its operation into the range of the preceding softer spring stage by a corresponding predetermined play of the respective control plate with respect to the corresponding windows or spring ends.

12 Claims, 4 Drawing Figures

U.S. Patent  Aug. 30, 1977  4,044,874
FIG. 1
FIG. 2
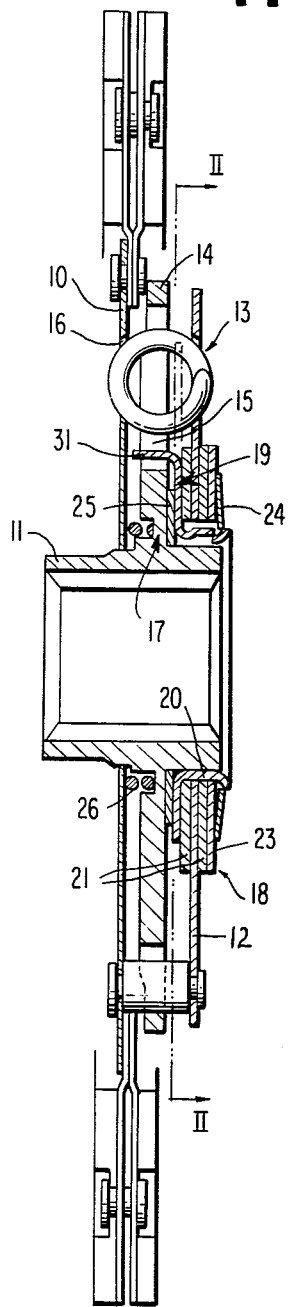
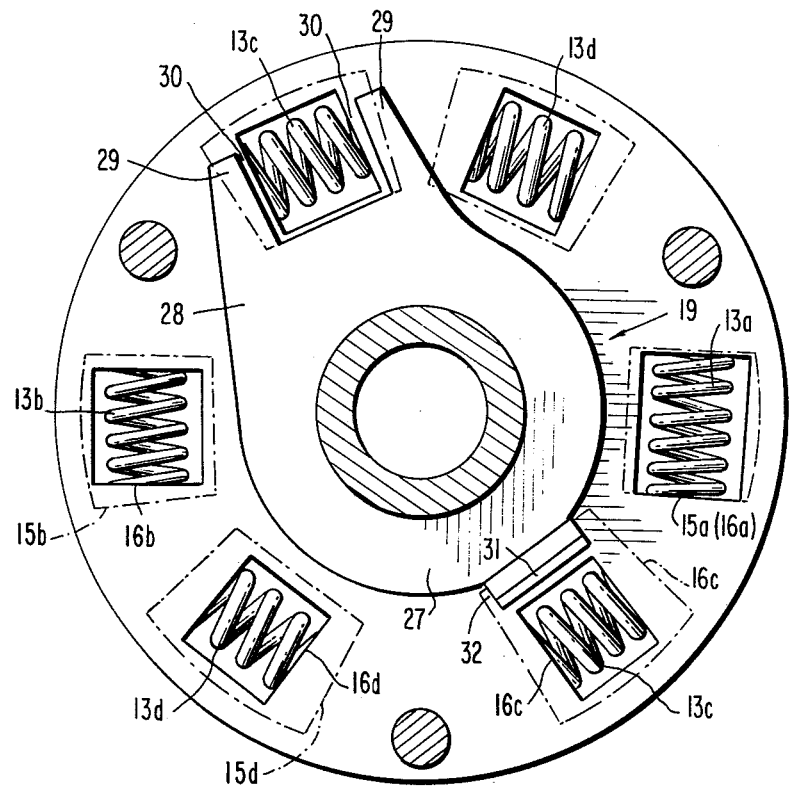

CLUTCH DISC WITH PLURAL FRICTION DAMPERS

The present invention relates to a clutch disc for motor vehicle main clutches with a disc member carrying the friction linings and torsionally elastically arranged with respect to a hub member, whereby for a multi-stage torsional elasticity several springs or spring sets with different characteristics are arranged in windows of a hub flange respectively of the disc member and of a side plate rigidly connected with the disc member, and whereby friction devices are coordinated to the springs whose starting point of operation is determined by control plates which engage with tabs, arms or the like in the corresponding windows and/or cooperate with the spring ends.

Such a clutch disc is already known (German Democratic Republic Pat. No. 57,771) in which a two-stage torsional elasticity and two separate damping devices are provided. The latter are exactly coordinated to the spring stages, i.e., in such a manner that during the change of the spring characteristic also the friction devices change. Clutch mechanisms with multi-stage spring characteristics are also known (German Gebrauchsmuster No. 1,985,802) whereby, however, the friction devices also change exactly with the changes of the spring characteristics. These known arrangements, however, are disadvantageous from a certain point of view since the close tie of the starting point of the friction operation to the starting point of the spring operation limits the constructive freedom of design and since additionally there exists the danger that certain parts get stuck or are hung-up during the return movement (reversed rotation) due to a self-blocking or self-jamming action that takes place.

The present invention is concerned with the task of avoiding the described disadvantages. As solution to the underlying problem, the present invention is predicated on the general concept that at least one friction device coordinated to a harder spring stage is moved up in its effect into the range of the preceding softer spring stage by a corresponding predetermined clearance or play of the corresponding sheet metal control members with respect to the corresponding windows or spring ends. In particular, it is proposed by the present invention that four stages of respectively harder characteristics and two separate friction devices are provided whereby the effect of the first friction device begins with the first (softest) spring stage and whereby the effect of the second friction device begins with the third spring stage, and in that the damping of the second friction device is moved up or advanced into the range of the second stage by a spacing of the sheet metal control plates with respect to the windows or spring ends of the third stage.

The proposed construction offers the advantage that the friction device moved up or advanced by the clearance or play does not become effective during the return movement (reversed rotation) so that a jamming due to self-locking is practically precluded. Furthermore, this advanced or moved-up friction device is effective in a shock-reducing manner during the change from thrust to traction. Finally, a constructive freedom of design results since the starting point of the friction device operation is no longer closely tied to the starting point of the spring operation.

It is possible to match the advanced or moved-up range to every desired condition and to go so far that the spacing between the sheet metal control members and the respectively coordinated edges of the windows or spring ends is equal to the entire operating range of the second stage. By virtue of this construction, the same damping will then result also for the second stage as for the third and fourth stage which, however, is then effective only during forward movement—and this is the significant difference—and not during the return movement.

It is additionally proposed by the present invention that the control plate includes an annular disc portion for the formation or accommodation of the friction surfaces and two essentially mutually oppositely disposed arms with the control devices. One embodiment is thereby characterized in that one arm at the control plate extends radially into a two-pronged fork whose prongs have the corresponding spacing from the spring ends and in that the oppositely disposed arm is axially angularly bent-off and engages with the corresponding spacing into the window at the hub flange. Finally, it is proposed as a third possibility that both arms each include one axial tab for the cooperation with the spring ends and in that the two radial extensions are coordinated to the two different directions of rotation.

A further feature of the present invention is that the annular disc portion at the control plate passes over at the inner circumference into a sleeve-like support portion and therewith serves for the accommodation of the second friction device. The second friction device is again formed by two friction linings on both sides of the side plate—whereby additionally an externally covering annular disc may be provided—and the entire package is forced against the control plate by a cup spring. Finally, the present invention is further characterized by an arrangement of the control plate between the hub flange and the side plate and by a further friction lining between the annular disc portion of the control plate and the hub flange as well as an expanding spring arranged between the latter and the disc member. The expanding spring is thereby appropriately constructed as coil spring or cup spring.

Accordingly, it is an object of the present invention to provide a clutch disc for motor vehicle main clutches which avoids by simple means the aforementioned shortcomings and drawbacks encountered in the prior art.

Another object of the present invention resides in a clutch disc for motor vehicle main clutches in which the starting point of operation of the friction device is not closely tied to the starting point of operation of the coordinated spring or springs.

A further object of the present invention resides in a clutch disc for main clutches which permits considerably more freedom in the construction and design thereof than has been possible in the prior art constructions.

Still a further object of the present invention resides in a clutch disc for main clutches in which a malfunctioning, especially as a result of jamming during the return motion, is effectively precluded.

Another object of the present invention resides in a clutch disc for main clutches in which a shock reduction is effectively attained during the change-over from thrust, i.e., operating condition of the vehicle when the engine is braking, to traction, i.e., operating condition of the vehicle when the engine is driving or pulling the vehicle.

These and further objects, features and advantages of the present invention will become more apparent from the following description when taken in connection with the accompanying drawing which shows, for purposes of illustration only, several embodiments in accordance with the present invention, and wherein:

FIG. 1 is a longitudinal cross-sectional view through a clutch disc in accordance with the present invention;

FIG. 2 is an elevational view, taken along line II—II of FIG. 1 and illustrating one embodiment of a sheet metal control plate in accordance with the present invention;

Figure 3:
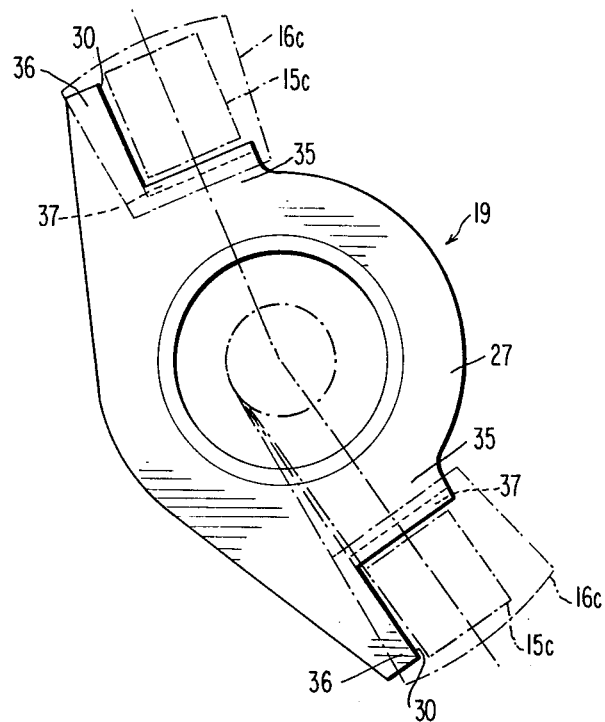
FIG. 3 is an elevational view, similar to FIG. 2, and illustrating another embodiment of a control plate in accordance with the present invention.

Referring now to the drawing wherein like reference numerals are used throughout the various views to designate like parts, according to FIG. 1, the clutch disc—whose basic construction is known as such—consists of a disc member 10 carrying the friction linings, which is torsionally elastically connected with the hub member 11. The disc member 10 is rigidly connected with the sheet metal side plate 12, for example, by bolts or the like. The springs generally designated by reference numeral 13 which are provided for the torsional elasticity are arranged in corresponding windows of a hub flange 14, on the one hand, and of the disc member 10 as well as of the side plate 12, on the other. The springs or spring sets have four different characteristics (see FIG. 2). The softest spring 13a forms the first stage or step. Opposite the spring 13a is the somewhat harder spring 13b of the second stage or step. Two mutually oppositely disposed springs 13c are provided for the third stage or step whereas the also approximately mutually oppositely disposed springs 13d form the fourth (hardest) stage or step. The stepped characteristics of the coupling disc can be readily recognized from FIG. 4 without further explanation.

The size of the windows 15 in the hub flange 14 and of the windows 16 in the disc member 10 and in the side plate 12 which are intended for the accommodation of the springs 13, determines the spring point of the spring operating range. In the first stage or step, both windows 15a and 16a are equally large, i.e., of identical size. In the other stages or steps, the dimensions in the circumferential direction of the windows 15b and 16b, 15c and 16c and 15d and 16d deviate from one another to an increasing extent. In the center position, the windows may be disposed symmetrically to one another even though it is appropriate in consideration of the drag moment to constitute the lateral spacing of the window edges different from one another in the traction direction and thrust direction, respectively.

Two friction devices for the damping in the circumferential direction are coordinated to the four spring stages. The first friction device generally designated by reference numeral 17 is coordinated to the first spring stage or step and it serves for the damping of the idling oscillations or vibrations. The second damping device generally designated by reference numeral 18 is coordinated to the third and fourth spring stage or step, and it serves for the damping of the rotational vibrations or oscillations occuring during the operating conditions.

The second friction device 18 is arranged, so to speak of, as block or unit on a control plate generally designated by reference numeral 19 which is disposed between the hub flange 14 and the side plate 12. The sheet metal control plate 19 determines with its control elements the starting point of operation of the second friction device 18. A sleeve-like support member 20 is arranged inwardly at the control plate 19, which receives the friction discs 21 of the second friction device 18. The friction discs 21 are disposed on both sides of the side plate 12. They are acted upon by a cup spring 24 by way of a cover disc 23. A friction lining 25 is disposed between the control plate 19 and the hub flange 14 which together with the coil spring 26 forms the first friction device 17. The coil spring 26 is disposed between the hub flange 14 and the disc member 10. The cover disc 23 is appropriately non-rotatably connected with the support member 20.

According to the FIG. 2, the control plate 19 includes an annular disc portion 27 for cooperation with the friction linings 21 of the second friction device 18 with the second friction device 18 holding together or drivingly connecting the annular disc portion 27 and side plate 12. This construction maintains the control plate 19 in contact with the hub flange 14 and the side plate 12 rubs the friction lining 21 so that the desired damping effect is achieved. A first arm 28 is disposed at this annular disc portion 27 which encloses with two fork-like prongs 29 and spring 13c of the third stage. However, the arrangement is thereby made in such a manner that a spacing 30 is present between the prongs 29 and the spring ends. The spacing corresponds to the operating range of the spring 13b of the second spring stage. An arm 31 is also disposed on the mutually opposite side which is axially angularly bent-off and engages into the window 16c of the of the third stage. Also, in this case, a spacing 32 exists between the arm 31 and the window 15c which corresponds also to the operating range of the second stage.

Figure 4:
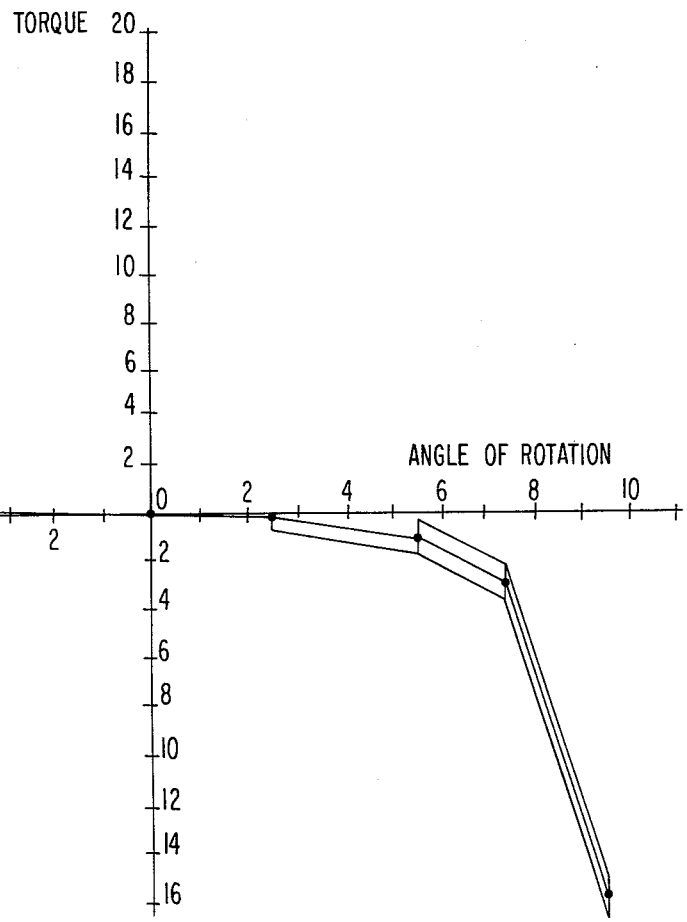
FIG. 4 is a diagram of the clutch characteristics in accordance with the present invention.

The operation can be readily explained by reference to FIGS. 1 and 2 in conjunction with FIG. 4. In the idling range, the first spring stage and the first friction device 17 cooperate. The damping is thereby practically negligible as can be seen from the diagram of FIG. 4. With a stronger rotation or twisting, in the normal rotational direction of the driving engine the second spring stage becomes operative and the second friction device 18 is now rendered operable by way of the control plate 19. This can be seen from the curve 33 in FIG. 4. By reason of the predetermined play 30, 32, a relative movement between the disc member 10 and side plate 12, on the one hand, and the hub flange 14, on the other hand, exists which results from the changing operating conditions of the driving engine. Thus, for example, a forward relative movement is effected with the engine driving and the hub flange 14 remaining behind relative to the side plate 12 and disc 10. A reverse or return movement is effected with the vehicle pushing the driving engine, i.e., when the hub flange 14 attempts to pass the side plate 12. In case of normal damping (third and fourth stages), the control plate 19 is pulled back to its terminal position by the control spring 13c. In the advanced damping stage, which corresponds to the second stage, the control plate 19 cannot be pulled back any further because of the play and it remains in the terminal position. Consequently, the advanced damping becomes effective only with the forward movement and not with a backward or reverse movement. In the operating condition of the engine, i.e., driving or pushing a vehicle, the third (springs 13c) and the fourth spring stage (springs 13d) then becomes effective whereby the damping action of the second friction device 18 is retained. Since, however, the corresponding predetermined play is no longer effective, the damping occurs in the third and fourth spring stages both during the forward as also during the return or reverse movement (see line 34 in FIG. 4).

The sheet metal control plate 19 according to FIG. 3 again includes an annular disc portion 27. Two radial arms 35 are provided on approximately mutually opposite sides, each of which includes an extension 36. This extension 36 has again the described play 30 with respect to the corresponding spring end. The arrangement is thereby made in such a manner that one extension 36 is effective for one direction of rotation and the other extension 36 for the other direction of rotation. At least one arm is angularly bent-off axially and engages with this angularly bent-off portion 37 in the corresponding window 16c within the hub flange 14. Also in this case, the already described play with respect to the windows 15c is again provided. The operation is exactly the same as already described hereinabove.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. In a clutch disc arrangement for main clutches which includes a disc means carrying friction linings, a hub means having a hub flange, said disc means being operatively connected with the flange of said hub means, side plate means, means for rigidly connecting said side plate means to said disc means, a first set of window means provided in said hub flange, a second set of window means provided in said disc means in alignment with said first set of window means, a third set of window means provided in said side plate means in alignment with said first and second set of window means, several spring means having respectively harder characteristics for producing a multi-stage operation of the clutch disc arrangement, said spring means being arranged in the window means of said hub flange, said disc means, and said side plate means, said spring means includes individual springs defining four stages, each spring being arranged in a respective set of aligned window means, and at least two friction means for damping vibrations of the clutch disc arrangement, a first of said friction means being operatively connected with the softest of the springs, a second of said friction means being operatively connected with at least one of the harder springs, the improvement comprising: control plate means mounted on said hub means for determining the starting point of operation of at least one of the friction means, the control plate means including means for engaging at least one of the two parts consisting of spring means and window means to render effective the friction means operatively connected with a relatively harder spring stage during the operating range of a preceding softer spring stage, the operation of the first friction means begins with the operation of the first spring stage and the operation of the second friction means begins with the operation of the third spring stage, and wherein said control plate means is mounted on said hub means so that a spacing is provided between said engaging means and the part consisting of at least one of the window means and spring ends of the third spring stage, said friction means being operatively effective in only one direction of rotation of the clutch disc arrangement.

2. A clutch disc arrangement according to claim 1, wherein said second friction means is operatively connected with the spring of the third spring stage of the clutch disc arrangement.

3. A clutch disc arrangement according to claim 1, wherein the at least one part consists of the window means, and wherein the spacing exists between edges of said window means and the engaging means, said spacing is equal substantially to the entire operating range of the second spring stage.

4. A clutch disc arrangement according to claim 1, wherein the at least one part consists of the spring means, and wherein the spacing exists between ends of the spring means and the engaging means, said spacing is equal substantially to the entire operating range of the second spring stage.

5. A clutch disc arrangement according to claim 1, wherein said engaging means engage both said window means and said spring means, the spacing exists between edges of said window means and said engaging means and between ends of said spring means and said engaging means, said spacing is equal substantially to the entire operating range of the second spring stage.

6. In a clutch disc arrangement for main clutches which includes a disc means carrying friction linings, a hub means having a hub flange, said disc means being operatively connected with the flange of said hub means, side plate means, means for rigidly connecting said side plate means to said disc means, a first set of window means provided in said hub flange, a second set of window means provided in said disc means in alignment with said first set of window means, a third set of window means provided in said side plate means in alignment with said first and second set of window means, several spring means having respectively harder characteristics for producing a multi-stage operation of the clutch disc arrangement, said spring means being arranged in the window of said hub flange, said disc means, and said side plate means, and at least two friction means for damping vibrations of the clutch disc arrangement, one of said friction means being operatively connected with the softest of the spring means, the other of said friction means being operatively connected with at least one of the harder spring means, the improvement comprising: control plate means mounted on said hub means for determining the starting point of operation of at least one of the friction means, the control plate means including means for engaging at least one of the two parts consisting of spring means and window means to render effective the friction means operatively connected with a relatively harder spring stage during the operating range of a preceding softer spring stage, said control plate means further includes an annular disc portion, said engaging means being provided on said annular disc portion and including two essentially mutually oppositely disposed arm portions with control elements, one of said arm portions terminates radially in a fork having two spaced prongs, the spacing between said prongs being equal to the operating range of the second spring stage, and wherein the oppositely disposed arm is axially angularly bent off and engages into one of said first set of window means.

7. A clutch disc arrangement for main clutches which includes a disc means carrying friction linings, a hub means having a hub flange, said disc means being operatively connected with the flange of said hub means, side plate means, means for rigidly connecting said side plate means to said disc means, a first set of window means provided in said hub flange, a second set of window means provided in said disc means in alignment with said first set of window means, a third set of window means provided in said side plate means in alignment with said first and second set of window means, several spring means having respectively harder characteristics for producing a multi-stage operation of the clutch disc arrangement, said spring means being arranged in the window means of said hub flange, said disc means and said side plate means and at least two friction means for damping vibrations of the clutch disc arrangement, one of said friction means being operatively connected with the softest of the spring means, the second of said friction means being operatively connected with at least one of the harder spring means, the improvement comprising: control plate means mounted on said hub means for determining the starting point of operation of at least one of the friction means, the control plate means including an annular disc portion, a sleeve-like support portion provided at an inner circumference of said annular disc portion for accommodating the second friction means, means provided on said annular disc portion for engaging at least one of the two parts consisting of spring means and window means to render effective the friction means operatively connected with a relatively harder spring stage during the operating range of a preceding softer spring stage, said engaging means including two essentially mutually oppositely disposed arm portions with control elements, a further friction lining disposed on said hub flange between the annular disc portion of the control plate means and the hub flange, and an expansion spring disposed between the hub flange and the disc means.

8. A clutch disc arrangement according to claim 7, wherein said expansion spring is a coil spring.

9. In a clutch disc arrangement for main clutches which includes a disc means carrying friction linings, a hub means having a hub flange, said disc means being operatively connected with the flange of said hub means, side plate means, means for rigidly connecting said side plate means to said disc means, a first set of window means provided in said hub flange, a second set of window means provided in said disc means in alignment with said first set of window means, a third set of window means provided in said side plate means in alignment with said first and second set of window means, several spring means having respectively harder characteristics for producing a multistage operation of the clutch disc arrangement, said spring means being arranged in the window means of said hub flange, said disc means, and said side plate means, and at least two friction means for damping vibrations of the clutch disc arrangement, a first said friction means being operatively connected with the softest of the spring means, a second of said friction means being operatively connected with at least one of the harder spring means, the improvement comprising: control plate means mounted on said hub means for determining the starting point of operation of at least one of the friction means, the control plate means including means for engaging at least one of the two parts consisting of spring means and window means to render effective the friction means operatively connected with a relatively harder spring stage during the operating range of a preceding softer spring range, said control plate means further including an annular disc portion, said engaging means being provided on said annular disc portion and including two essentially mutually oppositely disposed arm portions with control elements, a sleeve-like support portion provided at the inner circumference of said annular disc portion for the accommodation of the second friction means, a further friction lining is disposed on said hub means between said annular disc portion of the control plate means and the hub flange, an expansion spring disposed between the hub flange and the disc means, one of said arm portions terminates radially in a fork having two spaced prongs, the spacing between said prongs being equal to the operating range of the second spring, and wherein the oppositely disposed arm is axially angularly bent off and engages into one of said first set of window means.

10. In a clutch disc arrangement for main clutches which includes a disc means carrying friction linings, a hub means having a hub flange, said disc means being operatively connected with the flange of said hub means, side plate means, means for rigidly connecting said side plate means to said disc means, a first set of window means provided in said hub flange, a second set of window means provided in said disc means in alignment with said first set of window means, a third set of window means provided in said side plate means in alignment with said first and second set of window means, several spring means having respectively harder characteristics for producing a multistage operation of the clutch disc arrangement, said spring means being arranged in the window means of said hub flange, said disc means, and said side plate means, said spring means includes individual springs defining four spring stages, each spring being arranged in a respective set of aligned window means, and at least two friction means for damping vibrations of the clutch disc arrangement, a first of said friction means being operatively connected with the softest of the springs, a second of said friction means being operatively connected with at least one of the harder springs, the improvement comprising: control plate means mounted on said hub means for determining the starting point of operation of at least one of the friction means, the control plate means including means for engaging at least one of the two parts consisting of spring means and window means to render effective the friction means operatively connected with a relatively harder spring stage during the operating range of a preceding softer spring stage, the operation of the first friction means begins with the operation of the first spring stage and the operation of the second friction means begins with the operation of the third spring stage, and wherein said control plate means is mounted on said hub means so that a spacing is provided between said engaging means and the part consisting of at least one of the window means and spring ends of the third spring stage, said second friction means being operatively effective in only one direction of rotation of the clutch disc arrangement.

11. A clutch disc arrangement according to claim 10, wherein the at least one part consists of the window means, and wherein the spacing exists between edges of said window means and the engaging means, said spacing is equal substantially to the entire operating range of the second spring stage.

12. A clutch disc arrangement according to claim 11, wherein the at least one part consists of the spring means, and wherein the spacing exists between ends of the spring means and the engaging means, said spacing is equal substantially to the entire operating range of the second spring stage.

* * * * *